Figure 1:
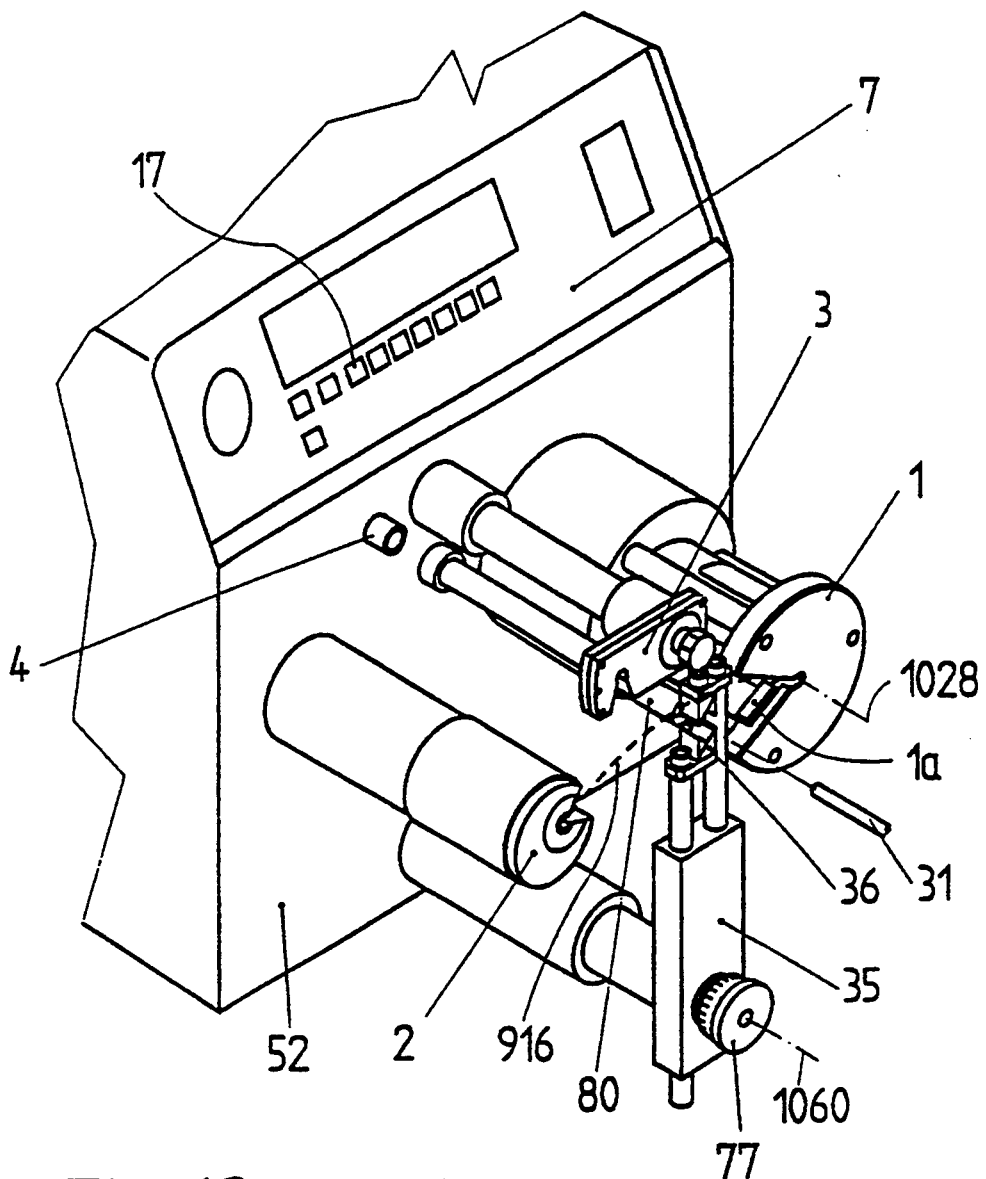

United States Patent [19]

Stepan

[11] Patent Number: 5,361,384
[45] Date of Patent: Nov. 1, 1994

[54] STRIPPING APPARATUS FOR FIBRE-OPTICAL CABLES

[76] Inventor: Jiri Stepan, St. Gallerstrasse 76, CH-7320 Sargans, Switzerland

[21] Appl. No.: 975,263

[22] Filed: Nov. 12, 1992

[30] Foreign Application Priority Data

Nov. 12, 1991 [CH] Switzerland ............ 3296/91-0

[51] Int. Cl.$^5$ .................................. G02B 6/36
[52] U.S. Cl. .................................. 385/134; 385/147
[58] Field of Search ............ 385/134, 135, 136, 137, 385/138, 139, 147; 81/9.51, 9.4; 29/564.4

[56] References Cited

U.S. PATENT DOCUMENTS

| | | | |
|---|---|---|---|
| 4,601,093 | 7/1986 | Cope | 81/9.51 |
| 4,745,828 | 5/1988 | Stepan | 81/9.51 |
| 4,854,667 | 8/1989 | Ebata et al. | 385/134 |
| 4,869,135 | 9/1989 | Hoffa | 81/9.51 |
| 4,879,926 | 11/1989 | Wollermann et al. | 81/9.51 |

FOREIGN PATENT DOCUMENTS 52-150581 12/1977 Japan.
53-91389 8/1978 Japan.
1289936 9/1972 United Kingdom.

*Primary Examiner*—Akm E. Ullah
*Attorney, Agent, or Firm*—Ostrolenk, Faber, Gerb & Soffen

[57] ABSTRACT

The invention relates to a stripping apparatus for fibre-optical cables (31), having rotatable stripping knives (1033) and rigid centering jaws (1040) which, in the operating position, are arranged between the stripping knives and the end of the cable (31). The centering jaws (1040) are furthermore located in the immediate vicinity of the stripping knives (1033) and hold the cable (31) to be stripped, in such a way that any torques acting on the cable (31) are absorbed and twisting or breakage of the cable (31) is avoided. Furthermore, modifications of the stripping machines are described which disclose the lateral insertion of a cable (31) into the particular stripping position inside a stripping station (1,2,3) by means of a manipulator (35), a novel stripping station (3) for stripping coating layers for optical waveguides and a novel conductor stop apparatus (80) and a drive-saving arrangement of several stripping stations (1,2,3) on a carriage (912).

13 Claims, 5 Drawing Sheets

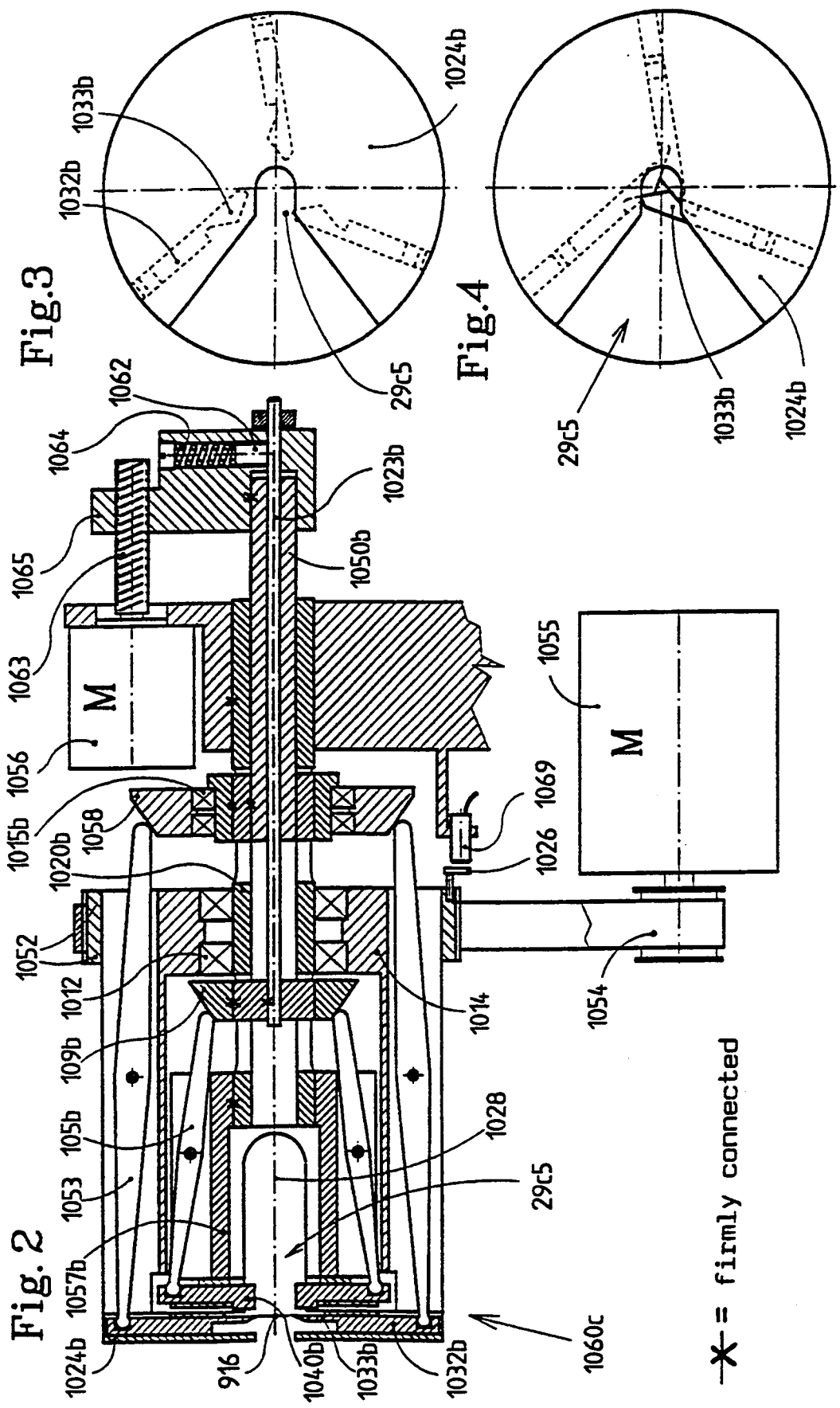

Fig. 10
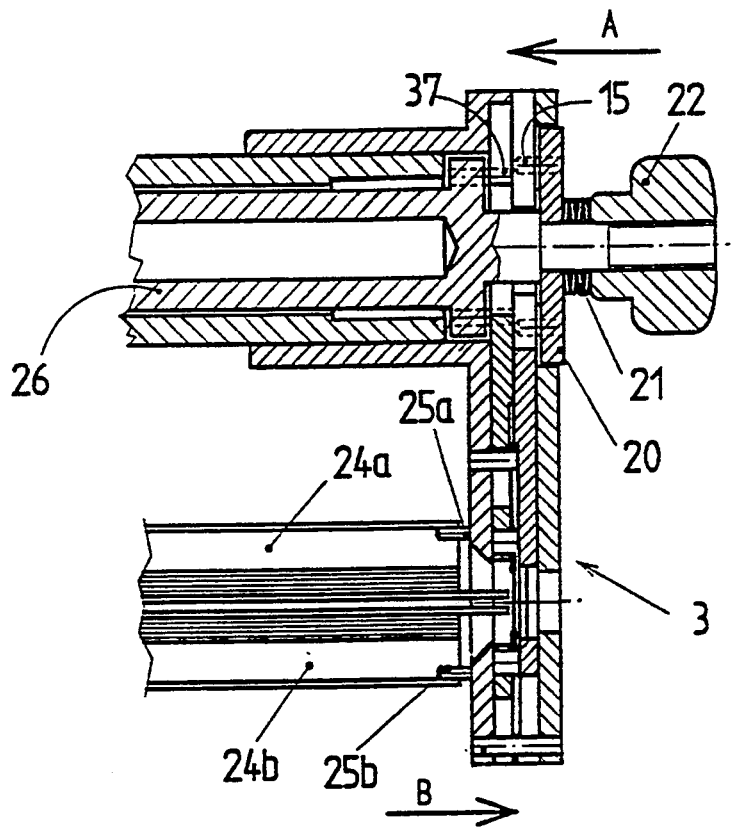
Fig. 11
Fig. 12
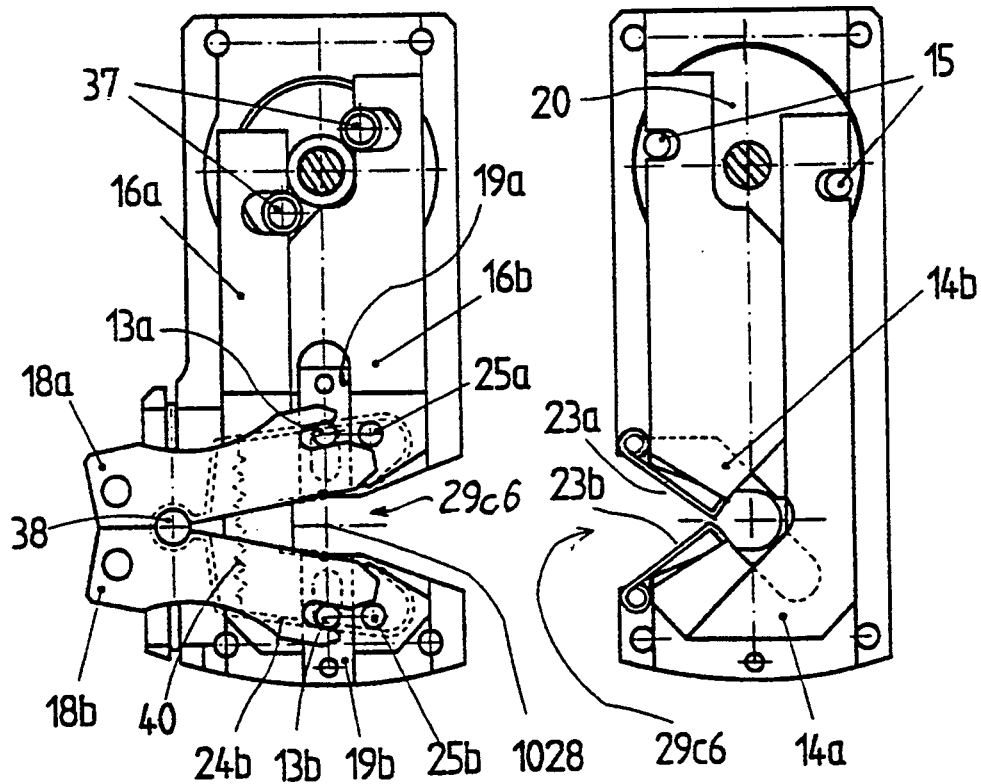

STRIPPING APPARATUS FOR FIBRE-OPTICAL CABLES

The invention relates to a stripping apparatus for cables, in particular fibre-optical cables, having at least one radially acting, rotatable stripping knife.

Such stripping apparatuses have been the subject of various publications and are used in particular for the automatic stripping of cables having several sheath layers.

U.S. Pat. No. 3,881,374 describes such an apparatus in which knives associated with centering jaws are capable of cutting into a cable and stripping off the sheath layer. Centering jaws are located on that side of the knives which faces the end of the cable, which, in conjunction with their rotatability, achieves a specific effect required in the U.S. Patent: the ends of the cables are twisted. However, this twisting causes damage and is undesirable, particularly in the case of thin cables or cables which are liable to break.

A considerable time ago, the applicant proposed an invention in which, inter alia, the twisting of the cable ends and the associated risk of breakage are reduced. There, the centering jaws are shifted to that side of the stripping knives which are opposite the end of the cable and are positively controlled independently of the stripping knives. See U.S. Pat. No. 4,745,828, for which there are a number of continuation applications, and U.S. Pat. No. 5,010,797. It is pointed out that all patent applications and publications cited in this patent application, and the prior art documents cited in each of these, are considered to have been disclosed for the purpose of this patent application. The stripping apparatuses described in the last two U.S. Patents make it possible in principle to carry out well defined, high-quality stripping steps. A similar structure is described in JP-A-64-3608.

With increasing reduction in the diameter of cables to be stripped and in particular with the need to be able also to strip fibre-optical cables completely and by an automated method, it is found, however, that the conventional stripping apparatuses can still lead to undesirable twisting or even to breakage (particularly in the case of glass fibres) of the conductors. The reason for this is that, through friction, the simultaneously rotating centering jaws additionally apply a torque to the conductor end which is already subjected to a critical and unacceptable torsional load by the stripping knives in the cutting region.

Since none of the known stripping apparatuses solve this problem, the object of the invention is to provide a stripping apparatus in which very thin and easily broken cables can be stripped. This object is achieved for the first time by the instant invention. Even thin glass fibre sheaths can easily be cut and the corresponding layers stripped off. The resulting torsional moments are absorbed in an optimal manner by the centering jaws.

In addition, various stripping arrangements have been disclosed in which several stripping stations effect complete stripping of a cable to be stripped. However, these arrangements have various disadvantages.

U.S. Pat. No. 4,601,093 describes a stripping apparatus in which cables of different diameters are stripped by a method in which an operator first pushes the cable into an insertion orifice of a first station and then pulls it out from there and pushes it into a second station, pulls it out again, etc. The process requires the constant presence of an operator and a fair degree of skill on the part of the latter.

U.S. Pat. No. 3,881,374 previously cited above also states that the cables are cut into pieces at one station and then transported by a conveyor belt to a processing station which then approaches in an axial direction the particular cable section to be processed, in order to strip said section. The cable thus moves in a radial direction relative to its axis, while the stripping apparatus must execute axial movements relative to the same axis. This requires complicated control means and is time-consuming. A similar apparatus is described in U.S. Pat. No. 4,879,926.

An apparatus having a laterally pivotable manipulator arm and axially movable stripping stations was exhibited under the designation "Dr. Schleuniger Productronic AG, ASM 9500" at an exhibition in 1989.

Moreover, a relatively new development in this area is the apparatus described in JP-3-15211 of January 1991. In this apparatus, a manipulator carriage is provided which is capable of transporting the cable ends to various stripping stations. The stripping stations themselves are adjacent to one another in a plane and are also guided by means of carriages in the axial direction of the cable. As in the case of the stripping apparatuses described above, this arrangement in JP-3-15211 gives rise to problems in the control and guidance of the cable ends; not least in the insertion of, for example, a flexible cable end in the axial direction. The curvature often results in incorrect positioning of the cable end and therefore sometimes leads to failure of the stripping apparatuses.

It is therefore a further object of the instant invention to make it possible to introduce those cables to be stripped laterally into the working position without then additionally having to move the entire relevant working station in the axial direction. This should, if required, also permit rapid and reliable changing of the cable to several stripping stations. It should be possible for even flexible or curved cables, such as, for example, fibre-optical cables, to be brought without problems in a particular required working position from one working station to the other. On inspection of the cable, the latter should be held by means of clamping jaws in the immediate vicinity of the end of the working station, in order to reliably position flexible or curved conductors. The direct insertion of a cable into the particular working station should be possible by means of a manipulator arm.

These objects are achieved, according to the instant invention by the lateral insertion, of the cable ends that are to be stripped. The cable ends are then in the immediate vicinity of the clamping jaws, in the correct position for making the first cut in the course of a cutting series when the manipulator has conveyed the cable to the particular working station. Additional axial movement of the manipulator or of the relevant working station can then be dispensed with, and as a result the stripping process is accelerated. In particular, fibre-optical cables or similar, flexible or curved cables can thus be inserted into the particular stripping stations without problems.

Furthermore, stripping apparatuses for stripping a coating from optical waveguides have been disclosed, which apparatuses have profiled knives which correspond to the internationally standardised diameters of the glass fibres (e.g. 125 $\mu$m). These known apparatuses are hand tools which are not suitable for the use in or on automatic stripping apparatuses. It is therefore the further object of the invention to develop the apparatus according to the instant invention by inventive measures to include the possibility of stripping a coating by an automated method. This project is achieved by apparatus that may also be used by itself, independently of the stripping apparatus described at the outset. Further embodiments and variants of this invention are evident from the description of embodiments illustrated in the accompanying drawings. The resulting advantages and potential applications are described briefly below.

The direct lateral cable feed into the working region in the interior of a stripping station by means of a manipulator makes it possible for the first time to introduce curved, long conductors of varying shape into the working region of stripping stations, something which was previously possible only by hand from the end. The insertion process according to the invention is also faster.

Both the insertion of the cable and the establishment of the required stripping length thereof are achieved rapidly and reproducibly by the combination of the manipulator with the conductor stop according to the invention, having a thrust sleeve and a stop rod. This combination itself can also be used in a novel and advantageous manner outside the scope of the invention.

The variant having several working stations on a carriage—preferably together with a stop rod—saves additional controlled linear drives and helps to reduce the cable feed time. This variant, too, could be used by itself, independently of the other variants, in particular the means for copying the carriage movement towards the stop rod and the independent control for the thrust sleeve being novel and inventive.

In addition to the nonrotatable centering apparatus, a second centering or tensioning apparatus absorbs all torsional stresses and helps to avoid damage to the conductor as a result of cutting by the stripping knives. In every case, clamping jaws fix axial positions of the cable. The embodiment having the rotating body according to FIG. 10 is very compact.

The embodiment of the coating stripping head having the adjusting slides and centering plates is very compact and permits precise gripping of the optical waveguide, the variant having the sliding clutch permitting the individual adjustment of the contact force of the centering plates against the conductor.

The use, known per se, of a heating element for the coating reduces its resistance to stripping.

The cone-controlled drive for the centering apparatus constructed according to the invention, is robust. Both the stripping knives and the centering jaws preferably correspond to the variants which are described by the inventor in U.S. Pat. Nos. 5,010,797 and 4,745,828.

Figure 13:
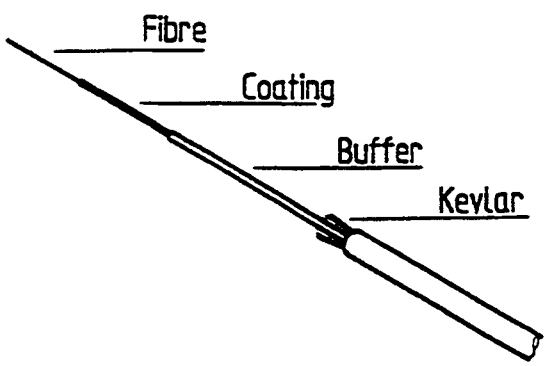
Figure 5:
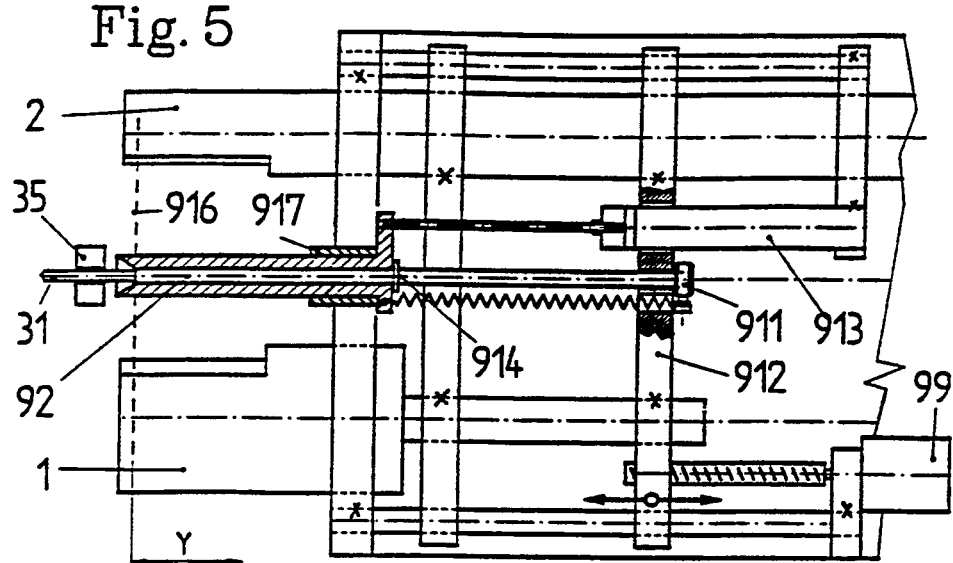
Figure 6:
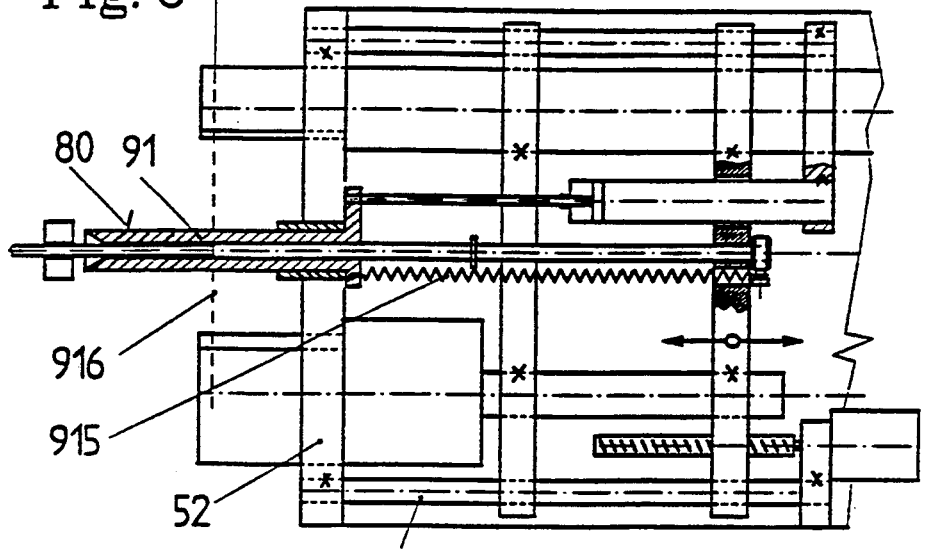
Figure 7:
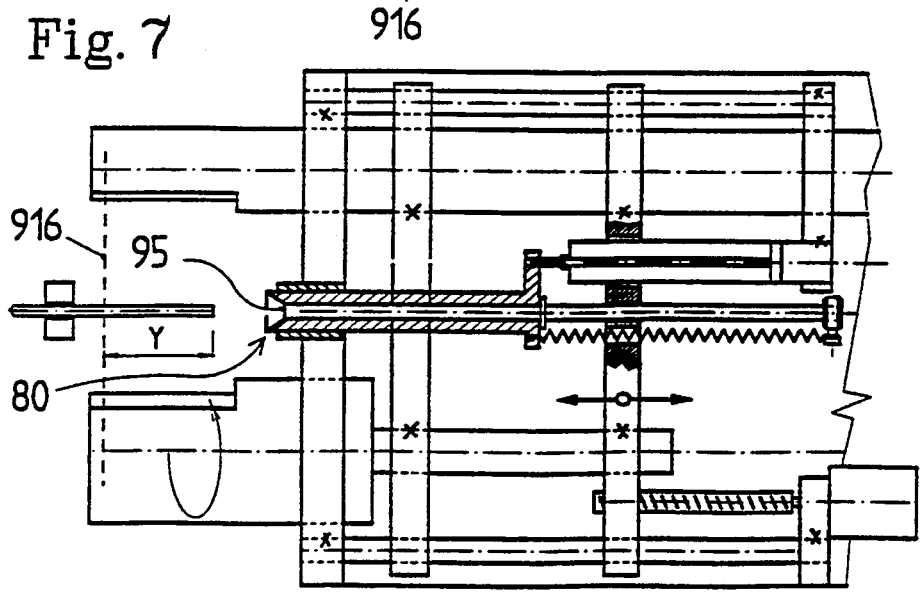
Figure 9:
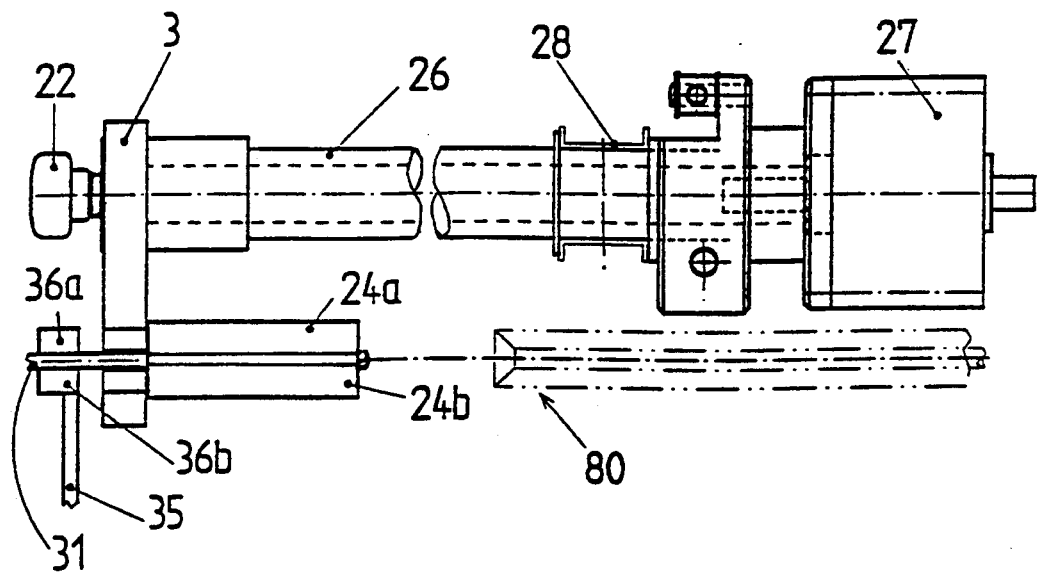
Figure 8:
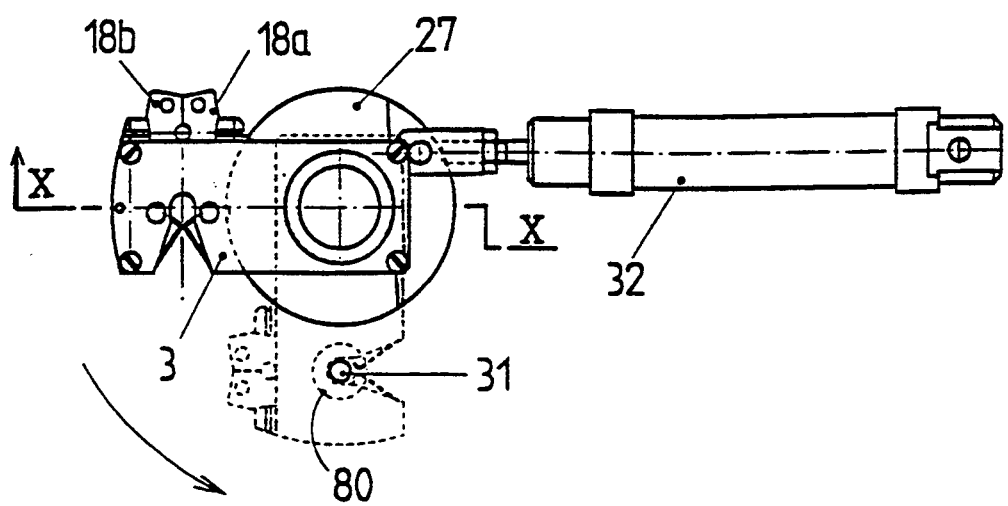

An embodiment is illustrated in detail in the accompanying drawings in which:

FIG. 1 shows an oblique front view of a stripping apparatus according to the invention, having several stripping stations and a manipulator arm, FIG. 2 shows a section through the right stripping station of FIG. 1, FIG. 3 shows the front view of the last-mentioned stripping station with opened stripping knives, FIG. 4 shows the same view with partly closed stripping knives, FIG. 5 shows a partial plan view of the stripping apparatus according to FIG. 1 with cut-away conductor stop, FIG. 6 shows the plan view from FIG. 5 with the stop rod of the conductor stop moved to the length-measuring position, FIG. 7 shows the plan view from FIG. 5 with retracted conductor stop prior to swivelling of the manipulator, FIG. 8 shows the uppermost stripping station according to FIG. 1 in the rest position, FIG. 9 shows a side view of the station from FIG. 8 in the operating position, FIG. 10 shows a partial section through the uppermost stripping station along the line X—X in FIG. 8, FIG. 11 shows the opened station looking in the direction of arrow A in FIG. 10, FIG. 12 shows the open station looking in the direction of arrow in FIG. 10, and FIG. 13 shows an enlarged oblique view of a fibre-optical cable with layers already partially stripped off.

It should be stated beforehand that design elements from the applicant's patents U.S. Pat. No. 4,745,828 (as well as all continuation applications) and U.S. Pat. No. 5,010,797 are preferably used for achieving control of the centering jaws and stripping lines. These patents are herewith incorporated by reference in this disclosure.

The Figures are described in relation to one another; identical parts are provided with identical reference symbols and similar parts bear identical reference symbols with different indices. FIG. 1 shows a stripping apparatus according to the invention, having a housing 7 which carries, in its upper region, an electronic control, a display and an input unit 17. Three working or stripping stations 1,2,3, a manipulator arm 35 having clamping jaws 36 and a conductor stop 80 are located in the lower region. The clamping jaws (36) serve for gripping the cable (31) which, in the starting position, can initially be pushed between the clamping jaws 36 and against the conductor stop 80.

The novel conductor stop 80 according to the invention, shown in FIG. 5 to 7, serves for defining a required stripping length Y on the cable 31. It is displaceably mounted in stub sleeve (917) in the housing wall 52. The longitudinal stop in the axial direction is achieved by means of a stop rod 92 which is longitudinally displaceable in a thrust sleeve 91. In the position according to FIG. 5, the stop rod 92 is in its outermost position which corresponds to a 0 stripping length. A cable 31 can be forced against the freely projecting end face (95) of said rod 92. In the position shown, this end face lies on an imaginary line 916, which simultaneously passes through all relevant working regions of relevant stripping stations (1,2).

FIG. 6 shows the length-measuring position—the line 916 has moved by the preset stripping length Y in that stop rod 92 has been retracted by carriage 912 moving to the right from its position in FIG. 5. The stop rod 92 is extended in a backward direction and connected there to an adjusting ring 911 which is capable of copying (following) any movement of carriage 912. For this purpose, the stop rod 92 is also kept retracted in the direction of the thrust sleeve 91 by means of a tension spring 915. The carriage 912 is displaceable by means of linear drive 99 mounted in a fixed manner in the housing. FIG. 7 shows the subsequent stripping position in which the conductor stop 80 has retracted completely behind the housing wall 52 and the stripping stations 1,2 travel back to the working position (916). The required stripping length has thus been set and the lateral displacement path for the cable 31 transported by the manipulator 35 has been freed. A thrust sleeve 91 is retracted in the axial direction by means of a linear drive 913 mounted in a fixed manner in the housing.

Alternatively, the stripping stations 1,2 could also remain in the position shown in FIG. 5, but the thrust sleeve 91 and the stop rod 92 and all stripping stations 1, which themselves also have to execute retraction movements for stripping a cable sheathing section, would then have to be provided with separate linear drives 58.

The thrust sleeve 91 is bevelled in a funnel-like manner at its end facing the manipulator 35, in order to facilitate the introduction of a cable. A further advantage, essential to the invention, is the determination of the length of, for example, a curved conductor 31 by the thrust sleeve 91, since said conductor is straightened in the inner bore of the sleeve 91, thus ensuring that the length determination is dimensionally correct.

The usual functional sequence is thus as follows: When the clamping jaws 36 of the manipulator 35 are opened, the cable 31 is pushed manually into the bore of the thrust sleeve 91 until it touches the preset stop rod 92. Either by means of a sensor, which is not shown, or as a result of a random start command, for example from a foot switch (not shown), the clamping jaws 36 close and the thrust sleeve 91 travels back in order to free the cable 31. The manipulator arm 35 then swivels into the required position, in which the cable end is held in the particular stripping station 1,2,3 (cf. for example station 2 for cutting through Kevlar fibres 30, as in the patent application (P-2554-GB) submitted on the same date and considered herein as having been disclosed).

Of course, the invention also relates to other manipulator designs, including those which are not pivotable or those which pivot about only one axis. In any case, the essential feature of all arrangements is that the cable ends are introduced laterally into the relevant stripping station. The invention also relates to those stripping stations which do not necessarily have a physical slot but in which the relevant stripping tools, such as knives, etc., are so far apart that cables can be introduced laterally. However, it should be noted that in various extensive test series it has been found that virtually only an arrangement having at least three knives 1033 is capable of applying sufficient axial tensile forces to the buffer (layer of a fibre-optical cable above the coating). In many cables, this layer in fact adheres so firmly that only parts of the buffer are torn off and only one or two knives are used. Conversely, when V-knives were used, there was a considerable disadvantage so that a double V-shaped groove was formed in the cut produced. The V-knives must slide against one another with their flat side, and the particular bevelled knife edge presses in the form of a wedge into the buffer and generates static friction there, which results in a torque. Hence, virtually only one arrangement of at least three knives which lie in a plane is universally applicable.

To limit the opening distance of the clamping jaws 36, a micrometer screw 77 (FIG. 1) is provided according to the invention in a particularly advantageous manner, which micrometer screw 77, via an active link, limits the possibility of axial movement of the clamping jaws and/or makes it possible to adjust the clamping pressure.

Station 2, shown on the left of the conductor stop 80, is preferably a station for cutting pull-relief fibres and is not described in detail here. A preferred embodiment of this station is disclosed in the patent application (P-2554-GB) submitted on the same date. The total disclosure content of this application is also considered to have been disclosed in this application.

A station 1 which essentially forms a stripping head for cutting through and stripping off layers of the cable (31) is shown to the right of the conductor stop 80.

According to the invention, the stations 1,2 are such that the cable (31) can be inserted laterally into the stations by means of the manipulator arm (35).

According to FIG. 2, the stripping station 1 has centering jaws 1040 which are arranged concentrically and nonrotatably with respect to the axis 1028 of a cable (31) to be stripped and are radially adjustable by an adjusting drive (1056) via a two-armed lever (105) and a cone (109). Furthermore, the stripping knives (1033b) which can be rotated about the axis (1028) by means of a rotary drive (1055) are provided concentrically thereto. The radially acting swivel mechanism for the stripping knives (1033) and for the centering jaws is described in, for example, U.S. Pat. Nos. 4,745,828 and 5,010,797.

In contrast to the elements described there, the structure shown for mounting the centering jaws 1040 has a central holding element 1057, which is held concentrically and axially nondisplaceably relative to the stripping knives 1033.

The radial movement of the centering jaws is effected by means of a two-armed lever (105b) which is controlled via a cone (109b) rigidly connected to a thrust rod (1023b).

The thrust rod (1023b) is engaged by a brake element or block (1062) whose braking effect can be set by adjusting a spring (1064). The brake block (1062) is mounted in a holder (1065) which on the one hand cooperates with a threaded spindle (1063) of an adjusting drive (1056) and on the other hand is rigidly connected to a control rod (1050b) which extends in a tubular manner around the thrust rod (1023b). The control rod (1050b) carries, in its front region, on a bearing (1015b), a second cone (1058) which, together with second two-armed levers (1053), is responsible for the radial control of the stripping knives (1033b) which are formed on knife holders (1032b).

Thus, the levers (1053) and the knives (1033) are also rotatable about the axis (1028) of rotation by means of the cone (1058). For this purpose, they are held in a rotary element (1014). The rotary element (1014) is equipped at one point with a pulley (1052) which can be set into rotation by means of a belt (1054) of a rotary drive (1055).

When the adjusting drive (1056) is operated, the cones (109b) and (1058) are initially uniformly displaced. However, as soon as the centering jaws (1040b) meet resistance as a result of contact with a cable sheath, the thrust rod (1023b) slips through against the braking force of the brake element (1062). This prevents undesirable squeezing of the cable. However, the stripping knives (1033b) continue moving to the required stripping gap under positive control since control rod (1050b) is fixedly secured to both holder 1065 and the inner race of bearing (1015b).

In contrast to the known insertion orifice, a lateral insertion orifice (29c5) is provided for introducing the cable end to be stripped, as can be more clearly seen in FIGS. 3 and 4. However, the invention also relates to any other knives which permit lateral introduction of the cable.

The described parts of the stripping knives 1033 and controls therefor form the knife head, which is closed at its end face by a cover plate 1024. The cover plate has a lateral slot as in the case of the knife-holding plate. They form there a slot-like insertion orifice 29c for the cable 31. For automatic operation of the knife head, it is necessary for the insertion orifice 29c to be positioned or to be turned towards the manipulator 35 prior to insertion of a cable. The position of the insertion orifice 102 is determined via a sensor mark 1026 which is positioned beside a stationary sensor 1069 (FIG. 2). As soon as the sensor mark 1026 and the sensor 1069 coincide, the required insertion position has been reached and the rotary drive stops the pulley 1052 and hence the rotary element 1014 or the knife head.

Both the centering jaws (1040) and the stripping knife (1033) are formed approximately as described in U.S. Pat. No. 5,010,797. Alternative variants of these are, however, possible.

The stripping station 3 for stripping a coating is located in the upper region of the apparatus and can be swivelled in towards a cable held in the clamping jaws 36. This facilitates the feed logistics of the manipulator arm 35.

The position of station 3, shown in FIG. 1, corresponds to the rest position. In this position, the insertion orifice 29c6 is opposite an inventive brush arrangement 4 which is equipped with an axially displaceable brush for cleaning the stripping station 3. Such a brush arrangement could also be used in other stripping stations or stripping apparatuses.

As can be more clearly seen in FIGS. 8–12, a drive 32 is connected to station 3 for the swivel movement of the latter, said drive being axially held at the other end, in a manner not shown, on the carriage 912 on bearing 28.

The stripping station 3 has profiled knives 18 which are pivotable about a guide pin 38. They are each driven by means of an adjusting slide 16 having a driver 13. The adjusting slides 16 are driven symmetrically and synchronously by means of control pins 37. The control pins 37 are held on a shaft 26 which can be rotated by means of a rotary drive 27.

They are also connected to a sliding clutch having a spring assembly 21 which is held pressed against an adjusting disc 20 by means of an adjusting collar 22. By turning the adjusting collar 22, the applied force or sliding force between the control disc 20 and the shaft 26 is determined.

The control disc 20 carries control pins 15 which engage recesses in centering plates 14. Turning the control disc 20 leads to a longitudinal displacement of the centering plates 14. These are each equipped, on their side facing the cable 31, with two retaining surfaces which are parallel to the corresponding retaining surfaces of the other centering plate 14. The plates 14 are appropriately undercut in order to permit complete closing of the retaining surfaces.

The stripping head 3 furthermore has two leg springs 23 which close the insertion orifice 29c6 under spring load. When a cable 31 is inserted, the spring force is overcome in order to snap in the cable. The leg springs 23 therefore act as precentering means during longitudinal adjustment of the stripping station for reaching a cutting position close to the cable end (as can be seen, for example, in FIG. 13). They can advantageously be used in all stripping stations having a lateral insertion slot.

Scraping plates 19 which are parallel to the profiled knives 18 and behind the edge of which the profiled knives 18 swivel back into the rest position are provided for scraping any coating residues from the profiled knives 18. At this edge, any coating still adhering is scraped off, the brush subsequently removing all remaining residues.

On the guide pin 38, flat heating elements 24 are rotatably mounted in the axial direction of a cable to be stripped, which elements, if required, preheat the coating to make it easier to strip off. A spring 40 tensions the heating elements 24 in the closing direction of the profiled knives 18, with which they are connected in a nonpositive manner by means of connecting pins 25. The process has approximately the following stages: insertion of the cable by means of the manipulator which is in the immediate vicinity of the end face of the stripping station; the springs 23 grip and hold the cable 31; displacement of the stripping station towards the cable end to the required cutting position (the springs 23 prevent the cable 31 from slipping away); closing of the profiled knives 18 and heating elements 24; stripping of the coating with the profiled knives 18 closed, after a delay; opening said knives and swivelling back of the stripping head 3.

Opening of the profiled knives 18 thus automatically leads to opening of the heating elements 24.

The profiled knives themselves can easily be replaced. They are held only by spring force at the guide pins 38, so that they can easily be pulled out there manually. Holes or indentations are formed in the upper region to provide a more secure grip. The embodiment and arrangement of the profiled knives can advantageously also be used in other stripping apparatuses for coating. They are striking in their precision and do not damage the optical waveguide during stripping.

Most of the apparatuses and apparatus details described herein are novel for stripping machines and are inventive performances per se. They increase the stripping speed and the precision during stripping of fibre-optical cables.

I claim:

1. Stripping apparatus for fibre-optical cables, said stripping apparatus comprising a working station that includes:
    at least one radially acting, rotatable stripping knife;
    a centering apparatus which is located in close proximity to said at least one stripping knife and having an operating position in which said centering apparatus is disposed between the at least one stripping knife and a free end of a cable that is to be stripped by said at least one stripping knife;
    said centering apparatus being fixed against rotation and when in its operating position, said centering apparatus gripping the cable to hold same against rotation; and
    said at least one stripping knife being radially adjustable independently of the centering apparatus;
    wherein the at least one stripping knife and the centering apparatus are operatively constructed, arranged and controlled to receive the cable by insertion of the latter radially with respect to an axis of rotation of the at least one stripping knife, which axis of rotation coincides with a centering axis along which the centering apparatus locates said free end of said cable, and by insertion of a cable laterally into position for being centered by the centering apparatus and stripped by the at least one stripping knife.

2. Stripping apparatus according to claim 1, also comprising a laterally movable manipulator for feeding the cable laterally into a lateral insertion orifice at said working station.

3. Stripping apparatus according to claim 2, characterized in that the manipulator is mounted on a swivel axis; and that a conductor stop is positioned at a side of the manipulator and movable parallel to the swivel axis to set a length adjustment corresponding to a portion that is to be stripped from the cable by said at least one stripping knife.

4. Apparatus according to claim 3, characterized in that the conductor stop comprises a thrust sleeve and a stop rod which is arranged inside the thrust sleeve said sleeve and said rod being mounted for relative movement in a longitudinally adjustable manner, in order to clear a lateral path after said length adjustment is set.

5. Apparatus according to claim 4, characterized in that the stop rod is equipped with a stop (914) which, when said thrust sleeve executes a retraction movement into a housing, comes into contact inside said housing with an end of said sleeve and is thereby retracted by said sleeve;
    said thrust sleeve being connected via a spring to the stop rod; and
    said stop rod being adjustable relative to the thrust sleeve, by means of an adjusting ring on a carriage in the housing, into and out of a length-measuring position.

6. Apparatus according to claim 4, characterized by also comprising:
    a housing;
    a carriage which is displaceable parallel to the end of the cable that is to be stripped and which is operatively connected with said stop rod which extends through a wall of said housing;
    during length measurement of the end of said cable, all operating points of the working station, including a stop surface of the stop rod, lying along an imaginary line which is curved and concentric with respect to the swivel axis of the manipulator; and
    said carriage and said thrust sleeve each having a linear drive mounted in said housing.

7. Stripping apparatus according to claim 1, further characterized in that the centering apparatus includes clamping jaws operatively coordinated with the at least one stripping knife for axial holding of the cable;
    said jaws being parts of a manipulator for feeding the cable that is to be stripped.

8. Stripping apparatus according to claim 1, further characterized in that the at least one stripping knife is operatively connected with a knife holder which is guided on a rotatable knife-holding plate;
    said knife-holding plate being operatively connected to a rotary element which is mounted by at least one bearing on a nonrotatable bearing rod;
    said bearing rod also carrying the centering apparatus.

9. Apparatus according to claim 1, further characterized by including another working station in the form of a scraping head for removing a coating from the cable; and
    said scraping head being mounted to swivel from a rest position into working position towards the cable held in operative position by clamping jaws of a manipulator.

10. Apparatus according to claim 9, also characterized in that the scraping head includes a pair of profiled knives which are opposite one another in a plane and are pivotable by parallel adjusting slides symmetrically with respect to an axis of the cable to be stripped; and
    centering plates symmetrically and synchronously movable to operatively position said pair of profiled knives.

11. Apparatus according to claim 10, further characterized by also including a sliding clutch through which force is transmitted to move said centering plates;
    said sliding clutch having a spring assembly and a device for adjusting compression of said spring assembly.

12. Apparatus according to claim 11, further characterized by including at least one heating element for heating a coating on the cable;
    said at least one heating element being movable against a spring force, with movement of said at least one heating element being coupled to that of the profiled knives.

13. Stripping apparatus according to claim 1, characterized in that the centering apparatus includes at least two radially displaceable centering jaws which are guided on a centering disc; each of said jaws being driven radially by a lever having first and second arms; and said lever being driven by a tapered device which is guided longitudinally on a bearing rod by a thrust rod.

* * * * *